(12) United States Patent
Sabapathy et al.

(10) Patent No.: US 12,254,273 B2
(45) Date of Patent: Mar. 18, 2025

(54) NATURAL LANGUAGE PROCESSING TECHNIQUES USING TARGET COMPOSITE SENTIMENT DESIGNATION

(71) Applicant: Optum, Inc., Minnetonka, MN (US)

(72) Inventors: Rajesh Sabapathy, Gurugram (IN); Sumeet Jain, Gurugram (IN); Saurabh Bhargava, Eden Prairie, MN (US); Sandeep Chandra Das, Bhubaneswar (IN); Gourav Awasthi, Gurugram (IN); Praveen Bansal, Hanumangarh (IN); Gaurav, New Delhi (IN); Animesh, Patna (IN)

(73) Assignee: Optum, Inc., Minnetonka, MN (US)

( * ) Notice: Subject to any disclaimer, the term of this patent is extended or adjusted under 35 U.S.C. 154(b) by 210 days.

(21) Appl. No.: 17/517,120

(22) Filed: Nov. 2, 2021

(65) Prior Publication Data

US 2023/0137260 A1    May 4, 2023

(51) Int. Cl.
*G06F 40/30* (2020.01)
*G06N 3/04* (2023.01)

(52) U.S. Cl.
CPC .............. *G06F 40/30* (2020.01); *G06N 3/04* (2013.01)

(58) Field of Classification Search
None
See application file for complete search history.

(56) References Cited

U.S. PATENT DOCUMENTS

| | | | |
|---|---|---|---|
| 6,622,140 B1 | 9/2003 | Kantrowitz | |
| 9,201,866 B2 | 12/2015 | Lehman et al. | |
| 9,213,687 B2 | 12/2015 | Au | |
| 9,336,268 B1 * | 5/2016 | Moudy | G06F 40/30 |
| 9,384,189 B2 | 7/2016 | Lee et al. | |
| 9,792,279 B2 | 10/2017 | Kim et al. | |
| 11,170,175 B1 * | 11/2021 | Kohli | G06N 3/08 |
| 11,455,469 B2 * | 9/2022 | Alam | G06Q 10/107 |

(Continued)

FOREIGN PATENT DOCUMENTS

KR    10-1315734 B1    10/2013

OTHER PUBLICATIONS

Cameron, Rachel A. et al. In Search Of Compassion: A New Taxonomy Of Compassionate Physician Behaviours, Health Expectations, vol. 18, Issue 5, Oct. 2015, pp. 1672-1685, (Published Online: Dec. 4, 2013), DOI: 10.1111/hex.12160, PMID: 24305037; PMCID: PMC4051859.

(Continued)

*Primary Examiner* — Jesse S Pullias
(74) *Attorney, Agent, or Firm* — ALSTON & BIRD LLP

(57) ABSTRACT

There is a need for more effective and efficient predictive data analysis solutions and/or more effective and efficient solutions for generating an emotional sentiment score without the use of labelled data. In one example, embodiments comprise receiving an input text sequence, generating an intermediate emotional sentiment score object based at least in part on the input text sequence and by utilizing an emotional sentiment machine learning model, generating an overall emotional sentiment score based at least in part on the intermediate sentiment score object and by utilizing an emotional sentiment score transformation object, and performing one or more prediction-based actions based at least in part on the overall emotional sentiment score.

19 Claims, 9 Drawing Sheets

(56) References Cited

U.S. PATENT DOCUMENTS

| | | | |
|---|---|---|---|
| 2013/0231922 A1 | 9/2013 | Park et al. | |
| 2014/0365208 A1 | 12/2014 | De Choudhury et al. | |
| 2016/0342683 A1* | 11/2016 | Lim | G06F 16/3329 |
| 2017/0344224 A1* | 11/2017 | Kay | G06F 3/0482 |
| 2019/0188261 A1* | 6/2019 | Herzig | G06F 40/30 |
| 2020/0327709 A1* | 10/2020 | Liu | G06V 10/82 |
| 2021/0034708 A1* | 2/2021 | Prasad | G06N 3/045 |
| 2021/0064703 A1* | 3/2021 | Roy | G06F 40/30 |
| 2022/0245354 A1* | 8/2022 | Mackay | G10L 25/57 |
| 2022/0292261 A1* | 9/2022 | Movshovitz-Attias | G06N 20/00 |

OTHER PUBLICATIONS

Fares, Mireille et al. "Difficulties and Improvements To Graph-Based Lexical Sentiment Analysis Using LISA," In 2019 IEEE International Conference on Cognitive Computing (ICCC), Jul. 8, 2019, pp. 28-35, IEEE.

Novak, Petra Kralj et al. "Sentiment of Emojis," PLoS One, vol. 10, No. 12:e0144296, Dec. 7, 2015, pp. 1-22, DOI: 10.1371/journal.pone.0144296.

Sinclair, Shane et al. "Compassion in Health Care: An Empirical Model. Journal of Pain and Symptom Management," vol. 51, No. 2, Feb. 2016, pp. 193-203.

Strauss, C. et al. "What Is Compassion and How Can We Measure It? A Review of Definitions and Measures," Clinical Psychology Review, No. 47, Jul. 1, 2016, pp. 15-27, DOI: 10.1016/j.cpr.2016.05.004.

Wikipedia Contributors, "Flesch-Kincaid Readability Tests," In Wikipedia, The Free Encyclopedia, Jan. 26, 2022, (7 pages), (online), [Retrieved from the Internet Feb. 20, 2022] <URL:. https://en.wikipedia.org/wiki/Flesch%E2%80%93Kincaid_readability_tests>.

* cited by examiner

700

Identify a negative connotation value associated with each intermediate emotional sentiment evaluation dimension
701

Identify a positive connotation value associated with each intermediate emotional sentiment evaluation dimension
702

Identify a neutral connotation value associated with each intermediate emotional sentiment evaluation dimension
703

Determine the emotional sentiment score transformation weight value for each intermediate emotional sentiment evaluation dimension
704

Determine the overall emotional sentiment score
705

Identify a negative connotation value associated with each intermediate emotional sentiment evaluation dimension
801

Identify a positive connotation value associated with each intermediate emotional sentiment evaluation dimension
802

Identify a neutral connotation value associated with each intermediate emotional sentiment evaluation dimension
803

Generate an overall negative emotional sentiment score, an overall positive emotional sentiment score, or an overall neutral emotional sentiment score
804

FIG. 8

NATURAL LANGUAGE PROCESSING TECHNIQUES USING TARGET COMPOSITE SENTIMENT DESIGNATION

BACKGROUND

Various embodiments of the present invention address technical challenges related to performing natural language processing in a computationally efficient and predictively reliable manner. Existing natural language processing systems are ill-suited to efficiently and reliably perform sentiment designation and require using labelled data, which may be time consuming and labor intensive for a user to provide.

BRIEF SUMMARY

In general, embodiments of the present invention provide methods, apparatuses, systems, computing devices, computing entities, and/or the like dynamically generating an overall emotional sentiment score for an input text sequence and a target composite designation.

In accordance with one aspect, a method includes: receiving the input text sequence; generating, using the one or more processors, based at least in part on the input text sequence, and by utilizing an emotional sentiment machine learning model, an intermediate emotional sentiment score object, wherein: (i) the intermediate emotional sentiment score object is characterized by an intermediate emotional sentiment evaluation domain associated with a plurality of intermediate emotional sentiment evaluation dimensions, and (ii) the intermediate emotional sentiment score object comprises a plurality of intermediate emotional scores each associated with an intermediate emotional sentiment evaluation dimension with respect to the target composite sentiment designation; generating, using the one or more processors, based at least in part on the intermediate emotional sentiment score object, and by utilizing an emotional sentiment score transformation object, the overall emotional sentiment score, wherein the emotional sentiment score transformation object comprises an emotional sentiment score transformation weight value for each intermediate emotional sentiment evaluation dimension; and performing, using the one or more processors, one or more prediction-based actions based at least in part on the overall emotional sentiment score.

In accordance with another aspect, an apparatus comprising at least one processor and at least one memory including program code, the at least one memory and the program code configured to, with the processor, cause the apparatus to at least: receive the input text sequence; generate, based at least in part on the input text sequence, and by utilizing an emotional sentiment machine learning model, an intermediate emotional sentiment score object, wherein: (i) the intermediate emotional sentiment score object is characterized by an intermediate emotional sentiment evaluation domain associated with a plurality of intermediate emotional sentiment evaluation dimensions, and (ii) the intermediate emotional sentiment score object comprises a plurality of intermediate emotional scores each associated with an intermediate emotional sentiment evaluation dimension with respect to the target composite sentiment designation; generate, based at least in part on the intermediate emotional sentiment score object, and by utilizing an emotional sentiment score transformation object, the overall emotional sentiment score, wherein the emotional sentiment score transformation object comprises an emotional sentiment score transformation weight value for each intermediate emotional sentiment evaluation dimension; and perform one or more prediction-based actions based at least in part on the overall emotional sentiment score.

In accordance with yet another aspect, a computer program product computer program comprising at least one non-transitory computer-readable storage medium having computer-readable program code portions stored therein, the computer-readable program code portions configured to: receive the input text sequence; generate, based at least in part on the input text sequence, and by utilizing an emotional sentiment machine learning model, an intermediate emotional sentiment score object, wherein: (i) the intermediate emotional sentiment score object is characterized by an intermediate emotional sentiment evaluation domain associated with a plurality of intermediate emotional sentiment evaluation dimensions, and (ii) the intermediate emotional sentiment score object comprises a plurality of intermediate emotional scores each associated with an intermediate emotional sentiment evaluation dimension with respect to the target composite sentiment designation; generate, based at least in part on the intermediate emotional sentiment score object, and by utilizing an emotional sentiment score transformation object, the overall emotional sentiment score, wherein the emotional sentiment score transformation object comprises an emotional sentiment score transformation weight value for each intermediate emotional sentiment evaluation dimension; and perform one or more prediction-based actions based at least in part on the overall emotional sentiment score.

BRIEF DESCRIPTION OF THE DRAWINGS

Figure 1:
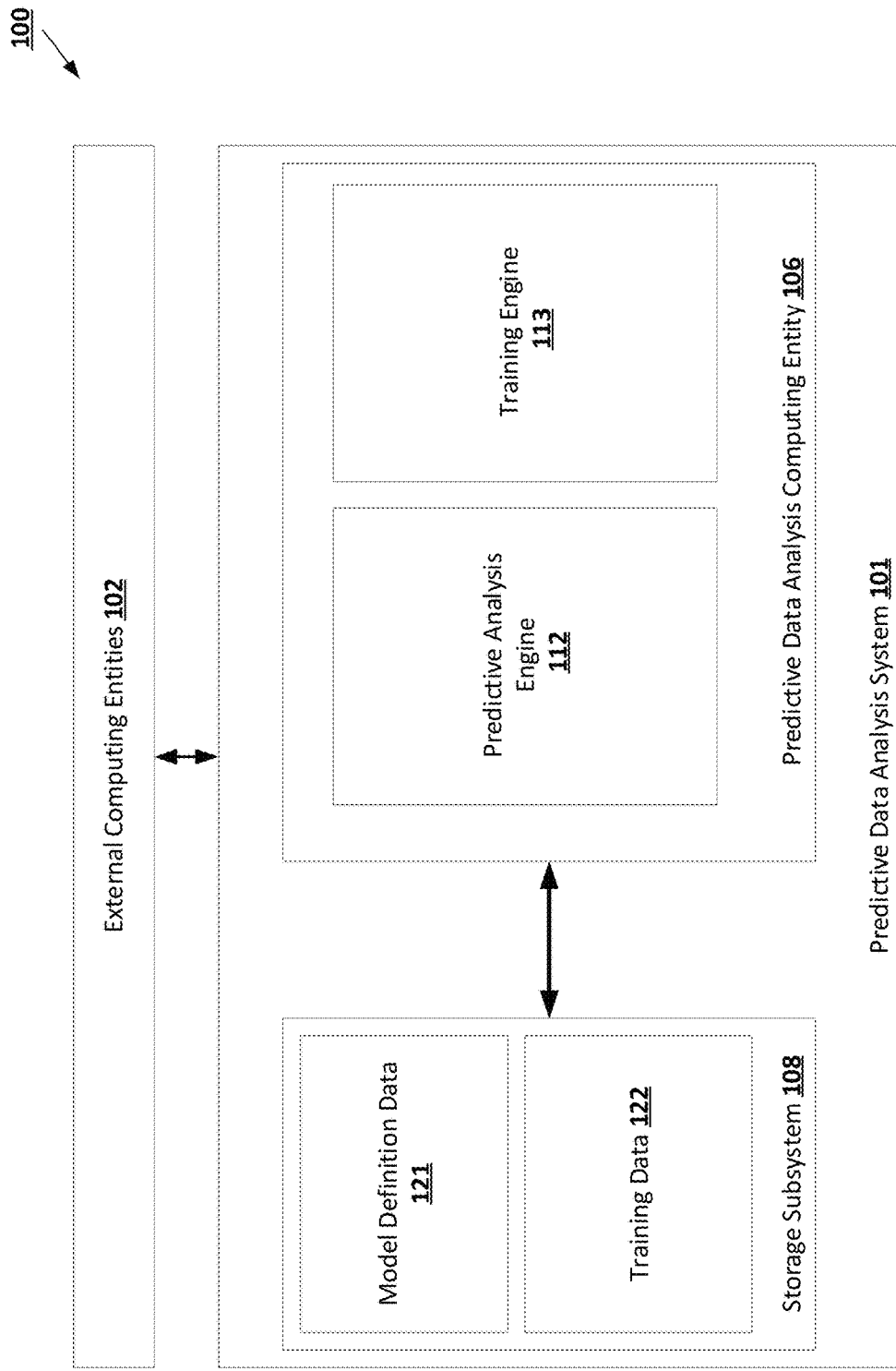
Figure 2:
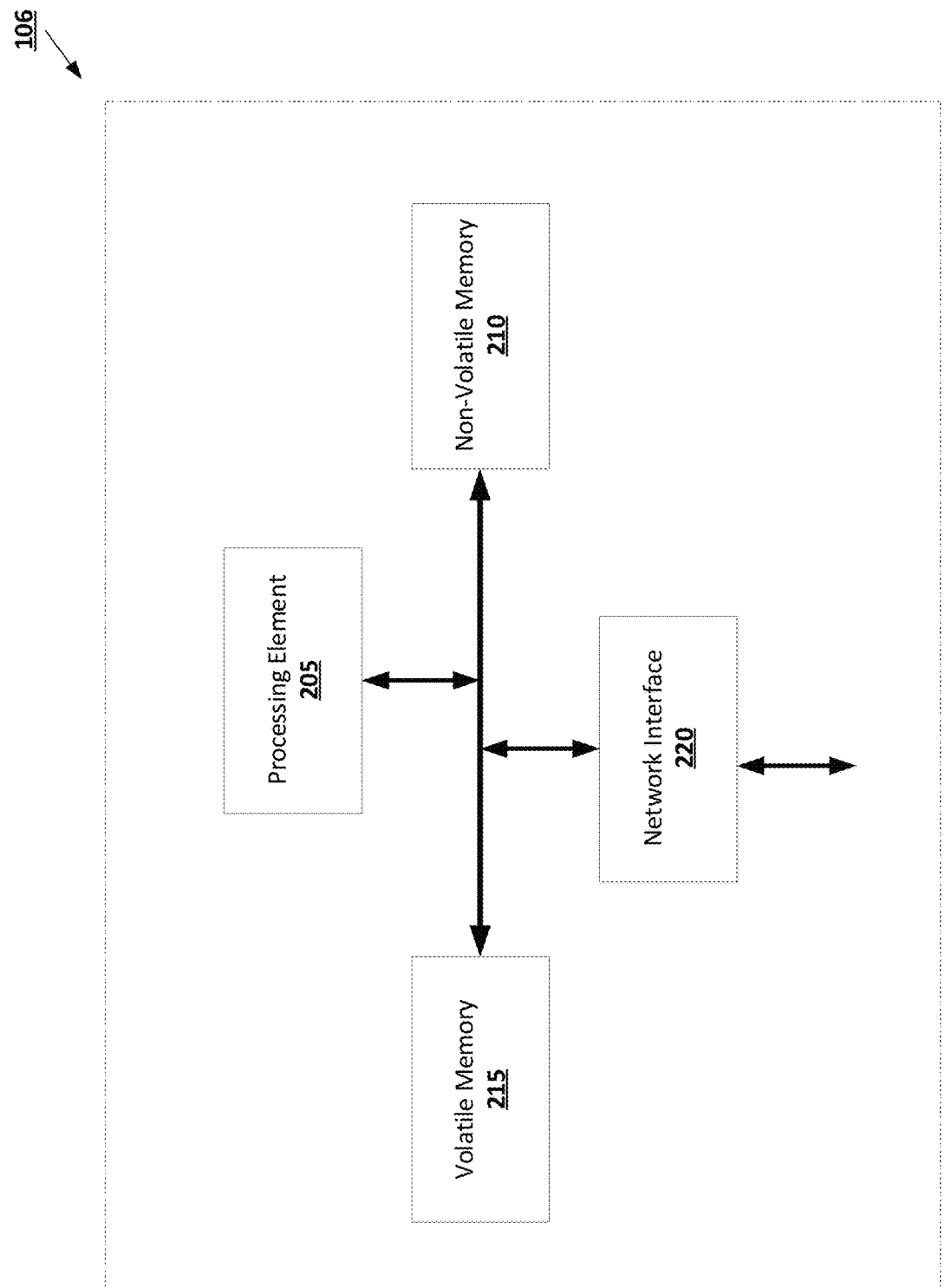
Figure 3:
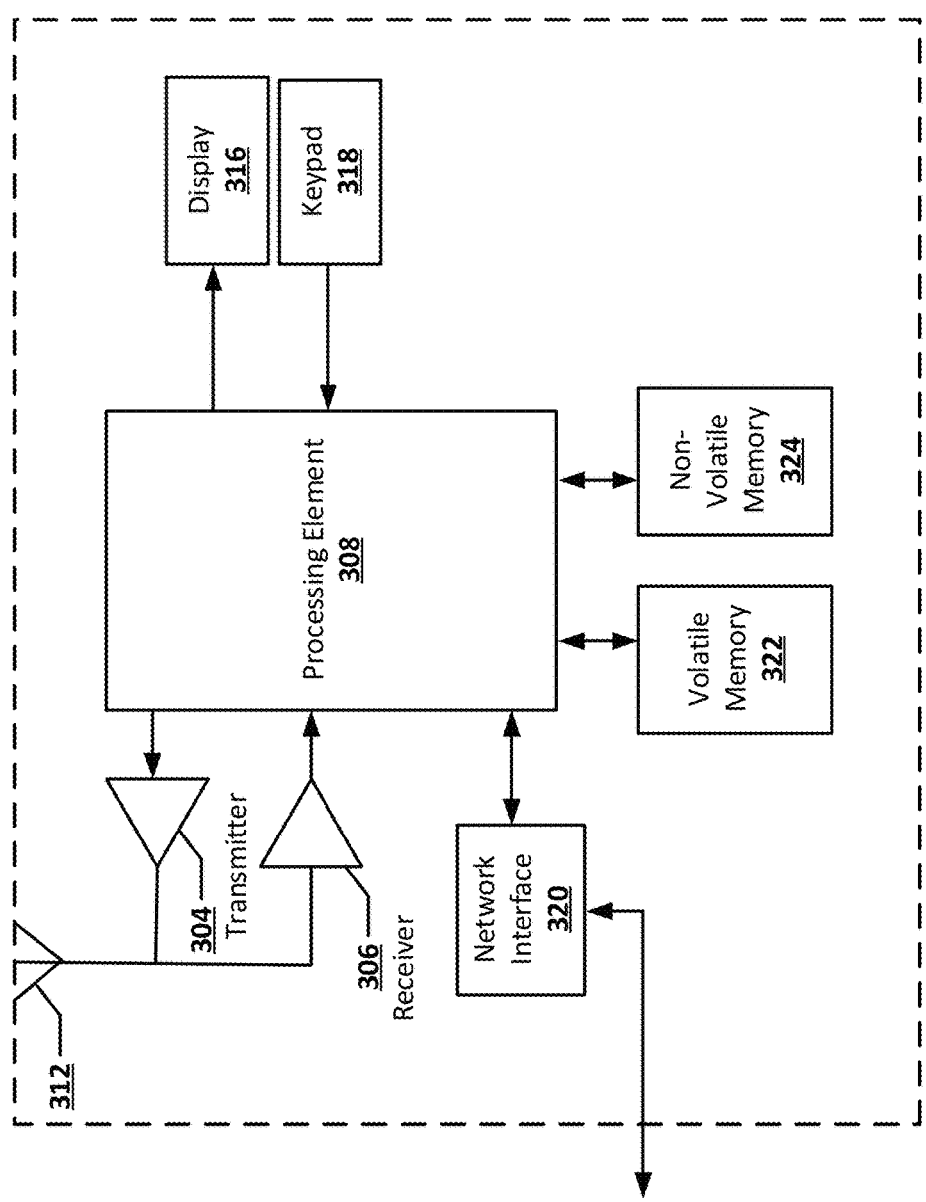
Figure 4:
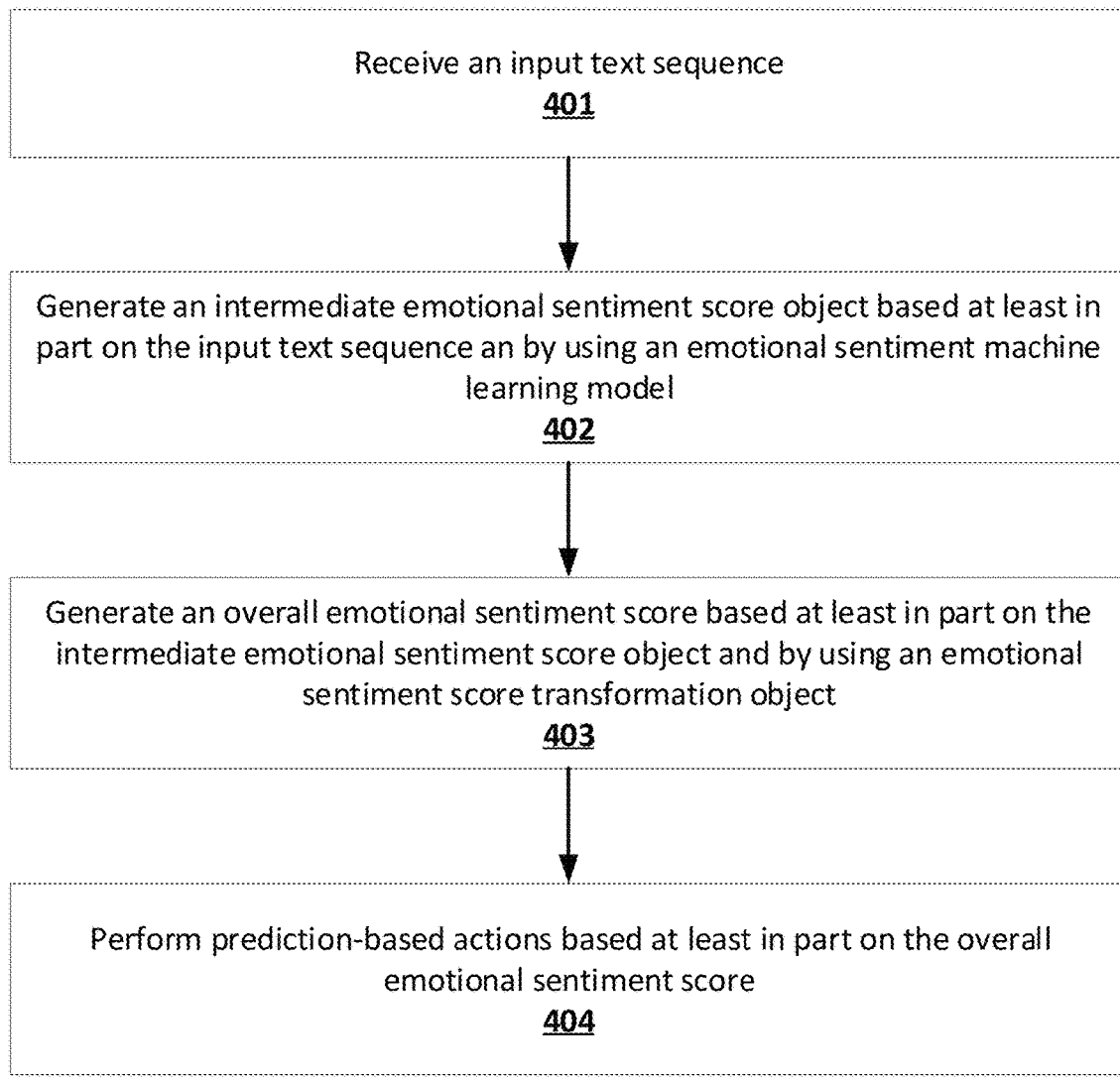
Figure 5:
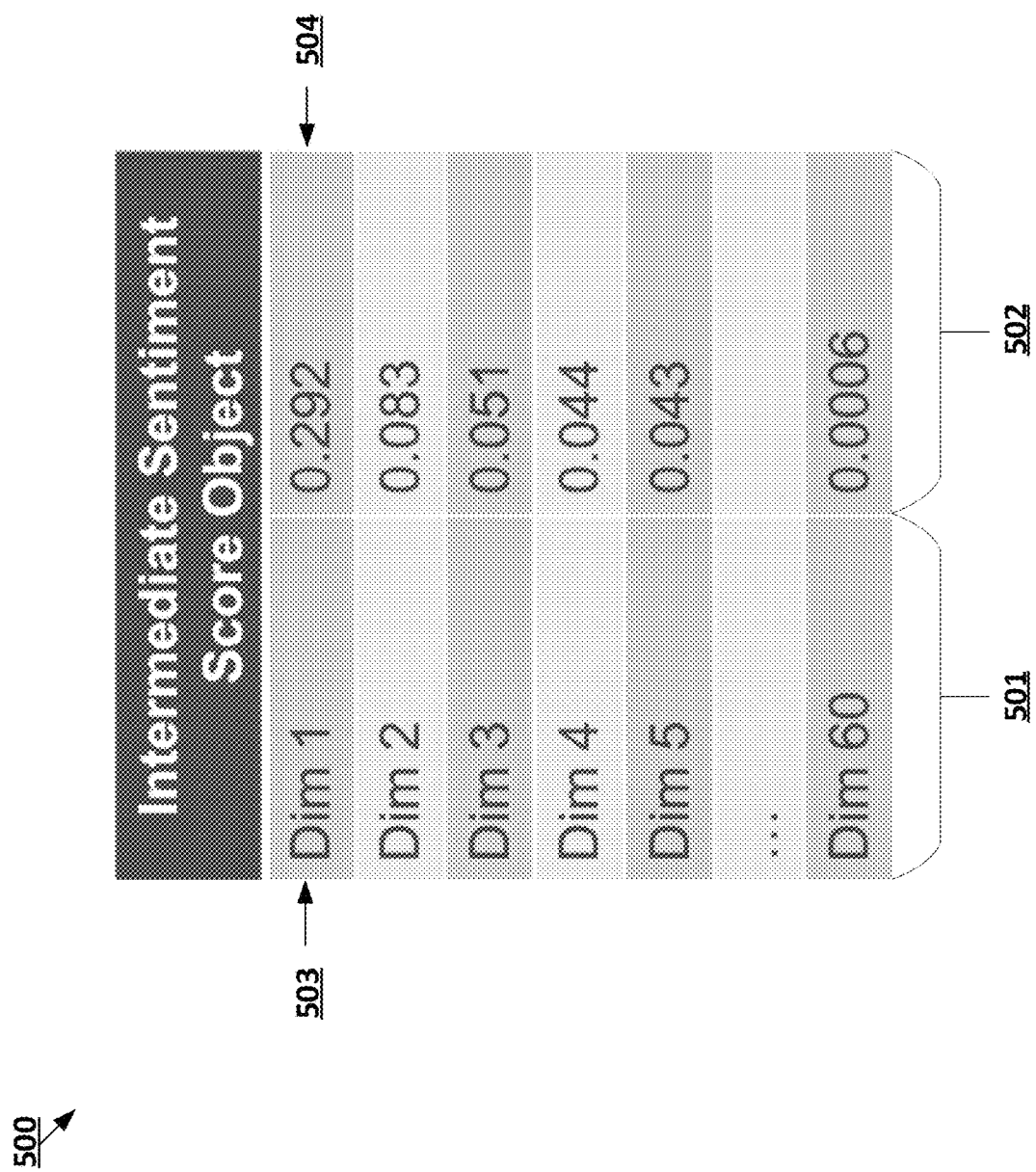
Figure 6:
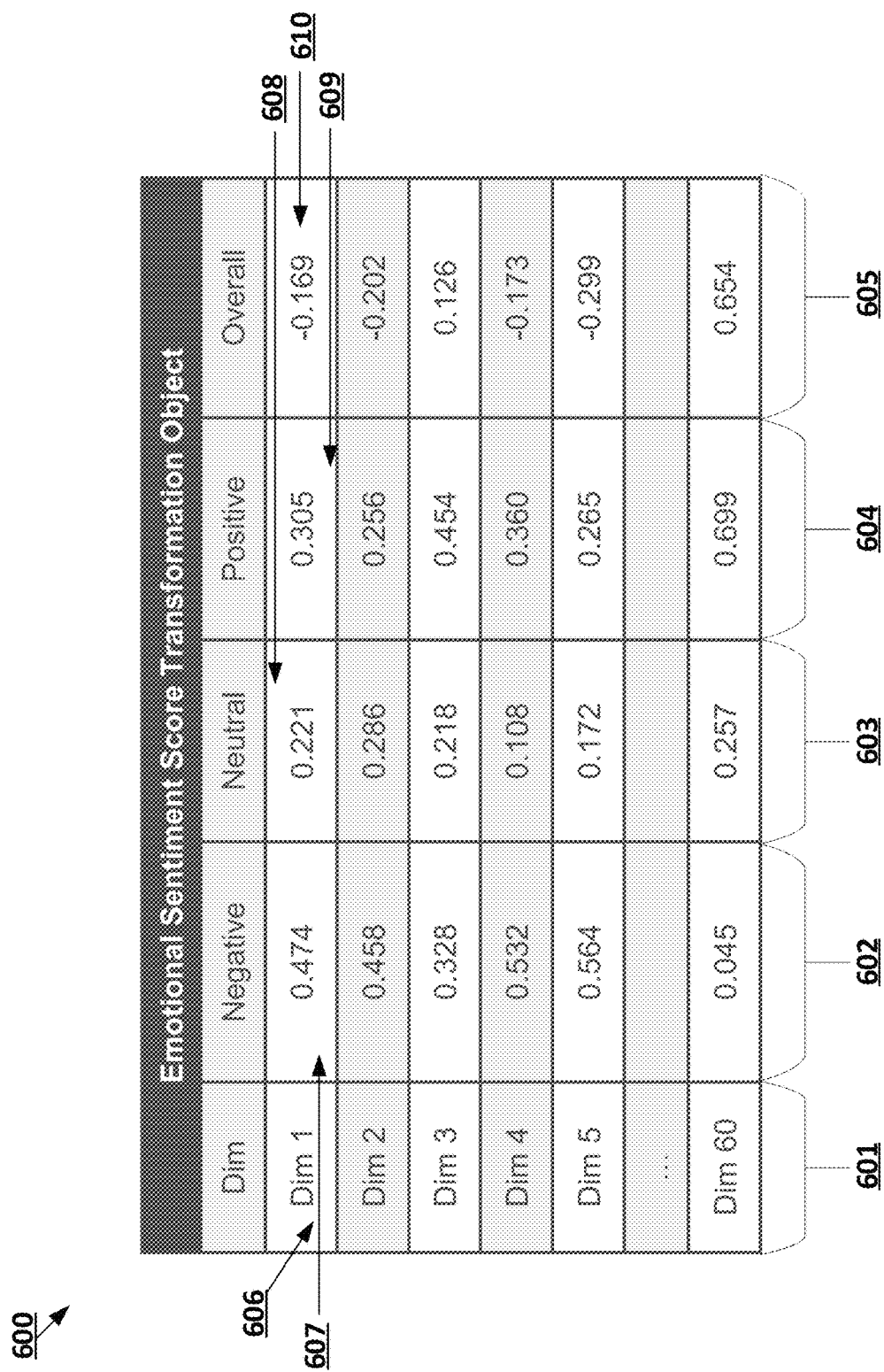
Figure 9:

Having thus described the invention in general terms, reference will now be made to the accompanying drawings, which are not necessarily drawn to scale, and wherein:

FIG. 1 provides an exemplary overview of an architecture that can be used to practice embodiments of the present invention;

FIG. 2 provides an example predictive data analysis computing entity in accordance with some embodiments discussed herein;

FIG. 3 provides an example external computing entity in accordance with some embodiments discussed herein;

FIG. 4 is a flowchart diagram of an example process for performing predictive data analysis in accordance with some embodiments discussed herein;

FIG. 5 provides an operational example of an example intermediate sentiment score object in accordance with some embodiments discussed herein;

FIG. 6 provides an operational example of an example emotional sentiment score transformation object in accordance with some embodiments discussed herein;

FIG. 7 is a flowchart diagram of an example process for performing predictive data analysis based at least in part on a negative connotation value, neutral connotation value, and positive connotation value in accordance with some embodiments discussed herein;

FIG. 8 is a flowchart diagram of an example process for generating an overall negative emotional sentiment score, overall neutral emotional sentiment score, or overall positive emotional sentiment score in accordance with some embodiments discussed herein; and FIG. 9 provides an operational example of a prediction based action in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL ADVANTAGES

Discussed herein methods, apparatus, systems, computing devices, computing entities, and/or the like for predictive data analysis of an input text sequence by generating an overall emotional sentiment score for the input text sequence. As will be recognized, however, the disclosed concepts can be used to perform any type of data analysis, including non-predictive data analysis. Examples of predictive data analysis include supervised machine learning analysis (e.g., classification analysis and regression analysis) and unsupervised machine learning analysis (e.g., clustering analysis).

Many existing predictive data analysis solutions are incapable of efficiently and reliably performing predictive data analysis without the explicit use of labelled training data. Due to this restriction, existing predictive data analysis solutions are limited in their output. For example, conventional predictive data analysis solutions directed to associating a text sequence with an emotion are typically restricted to basic emotions (e.g., anger, fear, sadness, disgust, surprise, anticipation, trust, and joy) and require the use of labelled data to train such predictive data analysis solutions on said basic emotions. Further, conventional predictive data analysis solutions are often constrained to association of emotions with single words within a text sequence such that the text sequence as a whole is not considered. Thus, there is a technical need for predictive data analysis solutions that are capable of efficiently and reliably performing predictive data analysis without the use of labelled training data and which consider an input text sequence as a whole.

Text sequences may also be difficult to accurately label due the inherent subjective nature of such text sequences. For example, a text sequence that appears business-like and straightforward to one individual may be interpreted as rude or impolite by another individual. Furthermore, more complex sentiments which may be a composite of positive, negative, and/or neutral sentiments are not as easily measured as basic emotions. For example, compassion by definition must arise in the context of suffering and involves a behavioral aspect such as the desire to ease or eliminate suffering. As such, compassion comprises both positive and negative sentiments.

Various embodiments of the present invention address technical challenges related to efficiently and reliably performing predictive data analysis without the use of labelled data. For example, in some embodiments, proposed solutions disclose generating an overall emotional sentiment score for an input text sequence. An emotional sentiment machine learning model may process the input text sequence and generate an intermediate emotional sentiment score object comprising a plurality of intermediate emotional scores each associated with an intermediate emotional sentiment evaluation dimension. The overall emotional sentiment score may be generated based at least in part on the intermediate emotional sentiment score object, and by utilizing an emotional sentiment score transformation object, wherein the emotional sentiment score transformation object comprises an emotional sentiment score transformation weight value for each intermediate emotional sentiment evaluation dimension. One or more prediction-based actions may then be performed based at least in part on the overall emotional sentiment score. In doing so, various embodiments of the present invention address shortcomings of existing predictive data analysis solutions and enable solutions that are capable of efficiently and reliably performing predictive data analysis without the use of labeled training data.

II. DEFINITIONS OF CERTAIN TERMS

The term "input text sequence" may refer to an electronically-received data construct that is configured to describe a text sequence to be processed. In some embodiments, the input text sequence comprises unstructured data. In some embodiments, the input text sequence comprises unlabeled data. The text sequence comprising the input text sequence may comprise one or more words each comprising one or more text characters. In some embodiments, the text sequence may comprise one or more sentences. Each sentence in the input text sequence may be denoted by one or more punctuation characters.

The term "target composite sentiment designation" may refer to an electronically-received data construct that is configured to describe a combination of one or more sentiments of interest to a user. The one or more sentiments described by the target composite sentiment designation may indicate the one or more sentiments of interest and further, may indicate an interest in how the one or more sentiments of interest relate to the input text sequence. For example, a target composite sentiment designation may describe the sentiment "uncompassionate", indicative to process the input text sequence to determine how uncompassionate the input text sequence is. In some embodiments, the strength of the correlation of one or more sentiments described by the of the target composite sentiment designation to the input text sequence may be indicated in the overall emotional sentiment score. In some embodiments, the target composite sentiment designation is associated with a subset of a plurality of candidate intermediate emotional sentiment evaluation dimensions.

The term "emotional sentiment machine learning model" may refer to an electronically-stored data construct that is configured to describe parameters, hyper-parameters, and/or stored operations of a machine learning model that is configured to process an input text sequence in order to generate an intermediate sentiment score object for the input text sequence and/or an overall emotional sentiment score for the input text sequence. In some embodiments, the emotional sentiment machine learning model is further configured to determine whether an overall emotional sentiment score satisfies one or more emotional sentiment score thresholds. In some embodiments, if the overall emotional sentiment score satisfies one or more emotional sentiment score thresholds, an output indicative that the overall emotional sentiment score satisfies the one or more emotional sentiment score thresholds may be generated. In some embodiments, if the overall emotional sentiment score fails to satisfy one or more emotional sentiment score thresholds, an output indicative of which of the one or more emotional sentiment score thresholds the overall emotional sentiment score fails to satisfy may be generated. In some embodiments, if the overall emotional sentiment score fails to satisfy one or more emotional sentiment score thresholds, the overall emotional sentiment score may be provided to one or more processing models to generate one or more modified text sequences based at least in part on the input text sequence and a target composite sentiment designation. In some embodiments, the emotional sentiment machine learning model comprises a neural network. In some embodiments, the emotional sentiment machine learning model comprises a long short term memory (LSTM) neural network. In some embodiments, the emotional sentiment machine learning model utilizes one or more natural language processing (NLP) techniques. In some embodiments, the parameters and/or hyper-parameters of the emotional sentiment machine learning model may be represented as values in a one-dimensional array, such as a vector. In some embodiments, the parameters and/or hyper-parameters of the emotional sentiment machine learning model may be represented as values in a two-dimensional array, such as a matrix.

The term "intermediate emotional sentiment score object" may refer to an electronically managed data construct indicative of a plurality of intermediate emotional scores for a plurality of intermediate emotional sentiment evaluation dimensions for the input text sequence. In some embodiments, the intermediate emotional sentiment score object is characterized by an intermediate emotional sentiment evaluation domain. The intermediate emotional sentiment evaluation domain may be associated with a plurality of intermediate emotional sentiment evaluation dimensions. The intermediate emotional sentiment score object may comprise a plurality of intermediate emotional scores each associated with an intermediate emotional sentiment evaluation dimension. In some embodiments, the intermediate emotional score associated with an intermediate emotional sentiment evaluation dimension is a value between 0 and 1 and is indicative of a percentage of correlation between the intermediate emotional sentiment evaluation dimension and the input text sequence. In some embodiments, the sum of each intermediate emotional score associated with the plurality of intermediate emotional sentiment value dimensions totals to 1. In some embodiments, the intermediate emotional score associated with an intermediate emotional sentiment evaluation dimension is indicative of the strength of the correlation between the corresponding intermediate emotional sentiment evaluation dimension and the input text sequence with respect to the target composite sentiment designation. In some embodiments, the plurality of intermediate emotional sentiment evaluation dimensions corresponds to a plurality of emoji designations. In some embodiments, the plurality of intermediate emotional sentiment evaluation dimensions is determined based at least in part on a subset of a plurality of candidate intermediate emotional evaluation dimensions that may be associated with a target composite sentiment designation. In some embodiments, the intermediate emotional sentiment score object is generated by an emotional sentiment machine learning model.

The term "emotional sentiment score transformation object" may refer to an electronically managed data construct that describes emotional sentiment score transformation weight values for each intermediate emotional sentiment evaluation dimension of the plurality of intermediate emotional sentiment evaluation dimensions with respect to a corresponding target composite sentiment designation that is associated with the emotional sentiment score transformation object. In some embodiments, the emotional sentiment score transformation weight values are between −1 and 1. An emotional sentiment score transformation weight value closer to −1 may indicate a more negative sentiment while an emotional sentiment score transformation weight value closer to 1 may indicate a more positive sentiment. An emotional sentiment score transformation weight value close to 0 may indicate a more neutral sentiment. In some embodiments, the emotional sentiment score transformation weight value for each intermediate sentiment evaluation dimension may be independent of the target composite sentiment designation. In some embodiments, the emotional sentiment score transformation object may further comprise a negative connotation value, a neutral connotation value, and/or a positive connotation value for each intermediate emotional sentiment evaluation dimension. In some embodiments, the emotional sentiment score transformation weight value for each intermediate emotional sentiment evaluation dimensions may be based at least in part on the negative connotation value, a neutral connotation value, and/or a positive connotation value associated with the intermediate emotional sentiment evaluation dimension. In some embodiments, the emotional sentiment score transformation weight value for each intermediate emotional sentiment evaluation dimension may be based at least in part on the overall composite total of the negative connotation value, neutral connotation value, and/or positive connotation value associated with the intermediate emotional sentiment evaluation dimension. In some embodiments, the negative connotation value, neutral connotation value, and/or positive connotation value associated with each intermediate emotional sentiment evaluation dimension may be indicative of the strength of the correlation between the corresponding intermediate emotional sentiment evaluation dimension and a negative, neutral, or positive sentiment, respectively. For example, an intermediate emotional sentiment evaluation dimension with a large positive connotation value may be most closely associated with a positive sentiment. In some embodiments, the negative connotation value, neutral connotation value, and/or positive connotation value are values between 0 and 1. In some embodiments, the total sum of the negative connotation value, neutral connotation value, and/or positive connotation value are equal to 1.

The term "overall emotional sentiment score" may refer to an electronically managed data construct indicative of the strength of the correlation between one or more sentiments described by the of the target composite sentiment designation and the input text sequence. For example, if an overall emotional sentiment score is high for a target composite sentiment designation describing the sentiment "uncompassionate", the input text sequence may have been determined to strongly correlate to uncompassionate sentiments as determined at least in part by the emotional sentiment machine learning model. The overall emotional sentiment score may be any real number. In some embodiments, the value of the overall emotional sentiment score may be a value between −1 and 1. In some embodiments, the value of the overall emotional sentiment score may be a value between 0 and 1. In some embodiments, one or more mathematical and/or logic operations may be performed on the intermediate emotional score and the emotional sentiment score transformation weight value for each intermediate emotional sentiment evaluation dimension to generate the overall emotional sentiment score. For example, multiplication operations may be performed between the intermediate emotional score and the emotional sentiment score transformation weight value for each intermediate emotional sentiment evaluation dimension. The resulting values may be summed together for each intermediate emotional sentiment evaluation dimension to generate an overall emotional sentiment score for the input text sequence.

The term "overall negative emotional sentiment score" may refer to an electronically managed data construct indicative of the strength of the correlation between one or more negative connotation values corresponding to the plurality of intermediate emotional sentiment evaluation dimensions associated with a target composite sentiment designation and the input text sequence. In some embodiments, the value of the overall negative emotional sentiment score may be a value between −1 and 1. In some embodiments, the value of the overall negative emotional sentiment score may be a value between 0 and 1. For example, if an overall negative emotional sentiment score is high for a target composite sentiment designation describing the sentiment "uncompassionate", the uncompassionate target composite sentiment designation may be associated with a negative sentiment as determined at least in part by the emotional sentiment machine learning model. In some embodiments, one or more mathematical and/or logic operations may be performed on the intermediate emotional score and the negative connotation value for each intermediate emotional sentiment evaluation dimension to generate the overall negative emotional sentiment score. For example, multiplication operations may be performed between the intermediate emotional score and the negative connotation value for each intermediate emotional sentiment evaluation dimension. The resulting values may be summed together for each intermediate emotional sentiment evaluation dimension to generate an overall negative emotional sentiment score for the input text sequence.

The term "overall neutral emotional sentiment score" may refer to an electronically managed data construct indicative of the strength of the correlation between one or more neutral connotation values corresponding to the plurality of intermediate emotional sentiment evaluation dimensions associated with a target composite sentiment designation and the input text sequence. In some embodiments, the value of the overall neutral emotional sentiment score may be a value between −1 and 1. In some embodiments, the value of the overall neutral emotional sentiment score may be a value between 0 and 1. For example, if an overall neutral emotional sentiment score is high for a target composite sentiment designation describing the sentiment "boredom", the boredom target composite sentiment designation may be associated with a neutral sentiment as determined at least in part by the emotional sentiment machine learning model. In some embodiments, one or more mathematical and/or logic operations may be performed on the intermediate emotional score and the neutral connotation value for each intermediate emotional sentiment evaluation dimension to generate the overall neutral emotional sentiment score. For example, multiplication operations may be performed between the intermediate emotional score and the neutral connotation value for each intermediate emotional sentiment evaluation dimension. The resulting values may be summed together for each intermediate emotional sentiment evaluation dimension to generate an overall neutral emotional sentiment score for the input text sequence.

The term "overall positive emotional sentiment score" may refer to an electronically managed data construct indicative of the strength of the correlation between one or more positive connotation values corresponding to the plurality of intermediate emotional sentiment evaluation dimensions associated with a target composite sentiment designation and the input text sequence. In some embodiments, the value of the overall positive emotional sentiment score may be a value between −1 and 1. In some embodiments, the value of the overall positive emotional sentiment score may be a value between 0 and 1. For example, if an overall positive emotional sentiment score is high for a target composite sentiment designation describing the sentiment "compassionate", the compassionate target composite sentiment designation may be associated with a positive sentiment as determined at least in part by the emotional sentiment machine learning model. In some embodiments, one or more mathematical and/or logic operations may be performed on the intermediate emotional score and the positive connotation value for each intermediate emotional sentiment evaluation dimension to generate the overall positive emotional sentiment score. For example, multiplication operations may be performed between the intermediate emotional score and the positive connotation value for each intermediate emotional sentiment evaluation dimension. The resulting values may be summed together for each intermediate emotional sentiment evaluation dimension to generate an overall positive emotional sentiment score for the input text sequence.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM FRAMEWORK

FIG. 1 is a schematic diagram of an example system architecture 100 for performing predictive data analysis operations and for performing one or more prediction-based actions (e.g., generating one or more modified text sequences). The system architecture 100 includes a predictive data analysis system 101 comprising a predictive data analysis computing entity 106 configured to generate predictive outputs that can be used to perform one or more prediction-based actions. The predictive data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 100 is to a generate predicted disease score associated with a target user depicted in a video stream data object.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to train a prediction model based at least in part on the training data 122 stored in the storage subsystem 108, store trained prediction models as part of the model definition data 121 stored in the storage subsystem 108, utilize trained models to generate predictions based at least in part on prediction inputs provided by an external computing entity 102, and perform prediction-based actions based at least in part on the generated predictions. The storage subsystem may be configured to store the model definition data store 121 for one or more predictive analysis models and the training data 122 uses to train one or more predictive analysis models. The predictive data analysis computing entity 106 may be configured to receive requests and/or data from external computing entities 102, process the requests and/or data to generate predictive outputs and provide the predictive outputs to the external computing entities 102. The external computing entity 102 may periodically update/provide raw input data (e.g., data objects describing an input text sequence) to the predictive data analysis system 101.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity 106 includes a predictive analysis engine 112 and a training engine 113. The predictive analysis engine 112 may be configured to perform predictive data analysis based at least in part on a received input text sequence. For example, the predictive analysis engine 112 may be configured to one or more prediction based actions based at least in part on an overall emotional sentiment score. The training engine 113 may be configured to train the predictive analysis engine 112 in accordance with the training data 122 stored in the storage subsystem 108.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (US SD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM FRAMEWORK

As described below, various embodiments of the present invention address technical challenges related to efficiently and reliably performing predictive data analysis without the use of labelled data. For example, in some embodiments, proposed solutions disclose generating an overall emotional sentiment score for an input text sequence. An emotional sentiment machine learning model may process the input text sequence and generate an intermediate emotional sentiment score object comprising a plurality of intermediate emotional scores each associated with an intermediate emotional sentiment evaluation dimension. The overall emotional sentiment score may be generated based at least in part on the intermediate emotional sentiment score object, and by utilizing an emotional sentiment score transformation object, wherein the emotional sentiment score transformation object comprises an emotional sentiment score transformation weight value for each intermediate emotional sentiment evaluation dimension. One or more prediction-based actions may then be performed based at least in part on the overall emotional sentiment score. In doing so, various embodiments of the present invention address shortcomings of existing predictive data analysis solutions and enable solutions that are capable of efficiently and reliably performing predictive data analysis without the use of labeled training data.

FIG. 4 is a flowchart diagram of an example process 400 for performing predictive data analysis based at least in part on the overall emotional sentiment score for an input text sequence. Via the various steps/operations of process 400, the predictive data analysis computing entity 106 may process the input text sequence to generate an overall sentiment score. The predictive data analysis computing entity 106 may then utilize machine learning solutions (e.g., solutions utilizing a neural network and/or LSTMs) to generate predictive insights regarding the input text sequence and perform prediction-based actions based at least in part on the overall emotional sentiment At step/operation 401, the predictive analysis engine 112 of the predictive data analysis computing entity 106 receives an input text sequence. In some embodiments, the input text sequence comprises unstructured and/or unlabeled data. The text sequence comprising the input text sequence may comprise one or more words each comprising one or more text characters. In some embodiments, the text sequence may comprise one or more sentences. Each sentence in the input text sequence may be denoted by one or more punctuation characters. For example, an input text sequence may comprise the text sequence, "You did not have a fever.". As another example, an input text sequence may comprise the text sequence, "You did not have a fever. There was no evidence of infection, acute renal failure, or the need for open surgery.".

In some embodiments, the predictive analysis engine 112 of the predictive data analysis computing entity 106 may also receive a target composite sentiment designation. In some embodiments, the predictive analysis engine 112 may receive the target composite sentiment designation substantially simultaneously with the input text sequence. In some embodiments, the target composite sentiment designation is selected and/or configured by a user and is indicative of the one or more sentiments of interest for the user and how the one or more sentiments of interest relate to the input text sequence. For example, a target composite sentiment designation may describe the sentiment "uncompassionate", indicative to process the input text sequence to determine the correlation between the input text sequence and the uncompassionate sentiment. In some embodiments, the strength of the correlation of one or more sentiments described by the target composite sentiment designation to the input text sequence may be indicated in the overall emotional sentiment score.

In some embodiments, the target composite sentiment designation is associated with a subset of a plurality of candidate intermediate emotional sentiment evaluation dimensions. For example, a target composite sentiment designation describing the sentiment "uncompassionate" may be associated with a subset of the plurality of candidate intermediate emotional sentiment evaluation dimensions most associated with uncompassionate sentiments. Said otherwise, a target composite sentiment designation may exclude one or more candidate intermediate emotional sentiment evaluation dimensions of the plurality of candidate intermediate emotional sentiment evaluation dimensions which are the least associated with the target composite sentiment designation.

At step/operation 402, the predictive analysis engine 112 of the predictive data analysis computing entity 106 generates an intermediate emotional sentiment score object by utilizing an emotional sentiment machine learning model. The intermediate emotional sentiment score object may be characterized by an intermediate emotional sentiment evaluation domain and comprise a plurality of intermediate emotional scores each associated with an intermediate emotional sentiment evaluation dimension with respect to the target composite sentiment designation. The intermediate emotional sentiment evaluation domain may be associated with a plurality of intermediate emotional sentiment evaluation dimensions. The intermediate emotional sentiment score object may comprise a plurality of intermediate emotional scores each associated with an intermediate emotional sentiment evaluation dimension. In some embodiments, the plurality of intermediate emotional sentiment evaluation dimensions corresponds to a plurality of emoji designations. In some embodiments, the plurality of intermediate emotional sentiment evaluation dimensions is determined based at least in part on a subset of a plurality of candidate intermediate emotional evaluation dimensions that may be associated with a target composite sentiment designation.

In some embodiments, the emotional sentiment machine learning model is used to generate the intermediate emotional sentiment score object. The emotional sentiment machine learning model may be configured to process an input text sequence in order to generate an intermediate sentiment score object and/or an overall emotional sentiment score. In some embodiments, the emotional sentiment machine learning model comprises a neural network. In some embodiments, the emotional sentiment machine learning model comprises a long short term memory (LSTM) neural network. In some embodiments, the emotional sentiment machine learning model includes natural language processing (NLP) techniques. In some embodiments, the parameters and/or hyper-parameters of the emotional sentiment machine learning model may be represented as values in a one-dimensional array, such as a vector. In some embodiments, the parameters and/or hyper-parameters of the emotional sentiment machine learning model may be represented as values in a two-dimensional array, such as a matrix. In some embodiments, the emotional sentiment machine learning model is a trained machine learning model. The emotional sentiment machine learning model may be trained using the training engine 113 of the predictive data analysis computing entity 106. In some embodiments, the emotional sentiment machine learning model may be trained using training data 122 stored in the storage subsystem 108. In some embodiments, the trained emotional sentiment machine learning model may be stored in the model definition data 121 of the storage subsystem 108.

In some embodiments, the intermediate emotional score associated with an intermediate emotional sentiment evaluation dimension is indicative of the strength of the correlation between the corresponding intermediate emotional sentiment evaluation dimension and the input text sequence. In some embodiments, the intermediate emotional score associated with an intermediate emotional sentiment evaluation dimension is a value between 0 and 1 and is indicative of a percentage of correlation between the intermediate emotional sentiment evaluation dimension and the input text sequence. In some embodiments, the sum of each intermediate emotional score associated with the plurality of intermediate emotional sentiment value dimensions totals to 1.

An operational example of an intermediate sentiment score object 500 is depicted in FIG. 5. The intermediate sentiment score object 500 may comprise a plurality of intermediate emotional sentiment evaluation dimensions 501. Each intermediate emotional sentiment evaluation dimensions of the plurality of intermediate emotional sentiment evaluation dimensions 501 is associated with an intermediate emotional score 502. In this particular example, the intermediate emotional sentiment evaluation dimension 503 is the intermediate emotional sentiment evaluation dimension associated with the largest intermediate emotional score value 504. As such, the input text sequence is mostly strongly correlated to the intermediate emotional sentiment evaluation dimension 503.

At step/operation 403, the predictive analysis engine 112 of the predictive data analysis computing entity 106 generates an overall emotional sentiment score based at least in part on the intermediate emotional sentiment score object and by utilizing an emotional sentiment score transformation object. In some embodiments, the emotional sentiment machine learning model may be used to generate the overall emotional sentiment score. The emotional sentiment score transformation object that is used to generate the overall emotional sentiment score may comprise an emotional sentiment score transformation weight value for each intermediate emotional sentiment evaluation dimension. In some embodiments, the emotional sentiment score transformation weight value for each intermediate emotional sentiment evaluation dimension may be representative of the overall composite of positive, negative, and/or neutral sentiments associated with the intermediate emotional sentiment evaluation dimension. In some embodiments, the emotional sentiment score transformation weight value may be any value between −1 and 1. An emotional sentiment score transformation weight value closer to −1 may indicate a more negative sentiment while an emotional sentiment score transformation weight value closer to 1 may indicate a more positive sentiment. An emotional sentiment score transformation weight value close to 0 may indicate a more neutral sentiment. In some embodiments, the emotional sentiment score transformation weight value for each intermediate sentiment evaluate dimension may be independent of the target composite sentiment designation.

The predictive analysis engine 112 may generate the overall emotional sentiment score based at least in part on the intermediate emotional sentiment score object and by utilizing an emotional sentiment score transformation object. In some embodiments, the predictive analysis engine 112 may perform one or more mathematical and/or logic operations on the intermediate emotional score and the emotional sentiment score transformation weight value for each intermediate emotional sentiment evaluation dimension. For example, the predictive data analysis computing entity 106 may perform multiplication operations between the intermediate emotional score and the emotional sentiment score transformation weight value for each intermediate emotional sentiment evaluation dimension. The predictive data analysis computing entity 106 may then sum the resulting values for each intermediate emotional sentiment evaluation dimension to generate an overall emotional sentiment score for the input text sequence.

In some embodiments, step/operation 403 may be performed in accordance with the various steps/operations of the process 700 that depicted in FIG. 7, which is a flowchart diagram of an example process for determining an emotional sentiment score transformation weight value.

At step/operation 701, the predictive analysis engine 112 of the predictive data analysis computing entity 106 identifies a negative connotation value associated with each intermediate emotional sentiment evaluation dimension of the plurality of intermediate emotional sentiment evaluation dimension. In some embodiments, the negative connotation value associated with each intermediate emotional sentiment evaluation dimension may be described by the emotional sentiment score transformation object. In some embodiments, the negative connotation value associated with each intermediate emotional sentiment evaluation dimension may be indicative of the strength of the correlation between the corresponding intermediate emotional sentiment evaluation dimension and a negative sentiment. For example, an intermediate emotional sentiment evaluation dimension with a large negative connotation value may be most closely associated with a negative sentiment.

At step/operation 702, the predictive analysis engine 112 of the predictive data analysis computing entity 106 identifies a positive connotation value associated with each intermediate emotional sentiment evaluation dimension of the plurality of intermediate emotional sentiment evaluation dimension. In some embodiments, the positive connotation value associated with each intermediate emotional sentiment evaluation dimension may be described by the emotional sentiment score transformation object. In some embodiments, the positive connotation value associated with each intermediate emotional sentiment evaluation dimension may be indicative of the strength of the correlation between the corresponding intermediate emotional sentiment evaluation dimension and a positive sentiment. For example, an intermediate emotional sentiment evaluation dimension with a large positive connotation value may be most closely associated with a positive sentiment.

At step/operation 703, the predictive analysis engine 112 of the predictive data analysis computing entity 106 identifies a neutral connotation value associated with each intermediate emotional sentiment evaluation dimension of the plurality of intermediate emotional sentiment evaluation dimension. In some embodiments, the neutral connotation value associated with each intermediate emotional sentiment evaluation dimension may be described by the emotional sentiment score transformation object. In some embodiments, the neutral connotation value associated with each intermediate emotional sentiment evaluation dimension may be indicative of the strength of the correlation between the corresponding intermediate emotional sentiment evaluation dimension and a neutral sentiment. For example, an intermediate emotional sentiment evaluation dimension with a large neutral connotation value may be most closely associated with a neutral sentiment.

At step/operation 704, the predictive analysis engine 112 of the predictive data analysis computing entity 106 determines an emotional sentiment score transformation weight value for each intermediate emotional sentiment evaluation dimension based at least in part on the negative connotation value for the intermediate emotional sentiment evaluation dimension, the positive connotation value for the intermediate emotional sentiment evaluation dimension, and the neutral connotation value for the intermediate emotional sentiment evaluation dimension. For example, the predictive analysis engine 112 may combine the three connotation values for an intermediate emotional sentiment evaluation dimension (e.g., emoji designation) to generate the emotional sentiment transformation weight value for the intermediate emotional sentiment evaluation dimension. Each of the negative connotation value, a neutral connotation value, and/or a positive connotation value associated with the intermediate emotional sentiment evaluation dimension may be a value between 0 and 1. In some embodiments, the emotional sentiment score transformation weight value may be based at least in part on the negative connotation value, a neutral connotation value, and/or a positive connotation value associated with the intermediate emotional sentiment evaluation dimension. In some embodiments, the emotional sentiment score transformation weight value may be determined by the difference between the positive connotation value associated with the intermediate emotional sentiment evaluation dimension and the negative connotation value associated with the intermediate emotional sentiment evaluation dimension.

In some embodiments, an emotional sentiment score transformation weight value for an intermediate emotional sentiment evaluation dimension is a vector comprising the positive connotation value for the intermediate emotional sentiment evaluation dimension, the neutral connotation value for the intermediate emotional sentiment evaluation dimension, and the negative connotation value for the intermediate emotional sentiment evaluation dimension. In some embodiments, an emotional sentiment score transformation weight value for an intermediate emotional sentiment evaluation dimension is an atomic value determined by applying a defined formula to the positive connotation value for the intermediate emotional sentiment evaluation dimension, the neutral connotation value for the intermediate emotional sentiment evaluation dimension, and the negative connotation value for the intermediate emotional sentiment evaluation dimension.

At step/operation 705, the predictive analysis engine 112 of the predictive data analysis computing entity 106 determines the overall emotional sentiment score for the input text sequence with respect to the target composite sentiment designation based at least in part on each emotional sentiment score transformation weight value for an intermediate emotional sentiment evaluation dimension and each intermediate emotional scores described by the intermediate sentiment score object. The predictive analysis engine 112 may perform one or more mathematical and/or logic operations on the intermediate emotional score and the emotional sentiment score transformation weight value for each intermediate emotional sentiment evaluation dimension, as described above in step/operation 403. The predictive data analysis computing entity 106 may then sum the resulting values for each intermediate emotional sentiment evaluation dimension to generate an overall emotional sentiment score for the input text sequence. In some embodiments, when each emotional sentiment score transformation weight value for an intermediate emotional sentiment evaluation dimension is a vector, the overall emotional sentiment score is a vector that is determined by applying a defined vector formula to each emotional sentiment score transformation weight value for a particular intermediate emotional sentiment evaluation dimension and the corresponding intermediate emotional score for the intermediate emotional sentiment evaluation dimension. In some embodiments, when each emotional sentiment score transformation weight value is a vector, the overall emotional sentiment score is an atomic value that is determined by applying a defined vector formula to each emotional sentiment score transformation weight value and corresponding intermediate emotional score to generate a vector and then applying a defined formula to the values of the resulting vector.

In some embodiments, step/operation 403 may be performed in accordance with the various steps/operations of the process 800 that depicted in FIG. 8, which is a flowchart diagram of an example process for generating an overall negative emotional sentiment score, an overall positive emotional sentiment score, or an overall neutral emotional sentiment score.

At step/operation 801, the predictive analysis engine 112 of the predictive data analysis computing entity 106 identifies a negative connotation value associated with each intermediate emotional sentiment evaluation dimension of the plurality of intermediate emotional sentiment evaluation dimension. This may be substantially similar to the step/operation described in step/operation 701 in FIG. 7.

At step/operation 802, the predictive analysis engine 112 of the predictive data analysis computing entity 106 identifies a positive connotation value associated with each intermediate emotional sentiment evaluation dimension of the plurality of intermediate emotional sentiment evaluation dimension. This may be substantially similar to the step/operation described in step/operation 702 in FIG. 7.

At step/operation 803, the predictive analysis engine 112 of the predictive data analysis computing entity 106 identifies a neutral connotation value associated with each intermediate emotional sentiment evaluation dimension of the plurality of intermediate emotional sentiment evaluation dimension. This may be substantially similar to the step/operation described in step/operation 703 in FIG. 7.

At step/operation 804, the predictive analysis engine 112 of the predictive data analysis computing entity 106 generates an overall negative emotional sentiment score, an overall positive emotional sentiment score, or an overall neutral emotional sentiment score based at least in part on each positive connotation value, each negative connotation value, each neutral connotation value, and each intermediate emotional score described by the intermediate sentiment score object. In some embodiments, the predictive analysis engine 112 may generate the overall negative emotional sentiment score, an overall positive emotional sentiment score, or an overall neutral emotional sentiment score based at least in part on the intermediate emotional sentiment score object and at least one of a positive connotation value, negative connotation value, or neutral connotation value by using the emotional sentiment score transformation model object. In some embodiments, the emotional sentiment machine learning model may be used to generate overall negative emotional sentiment score, an overall positive emotional sentiment score, or an overall neutral emotional sentiment score.

The predictive analysis engine 112 and/or the emotional machine learning model may generate an overall negative emotional sentiment score, an overall positive emotional sentiment score, or an overall neutral emotional sentiment score based at least in part on the intermediate emotional sentiment score object and by utilizing an emotional sentiment score transformation object. In some embodiments, the predictive data analysis computing entity 106 may perform one or more mathematical and/or logic operations on the intermediate emotional score and the negative connotation value, positive connotation value, or neutral connotation value described by the emotional sentiment score transformation weight value for each intermediate emotional sentiment evaluation dimension. For example, the predictive data analysis computing entity 106 may perform multiplication operations between the intermediate emotional score and the negative connotation value, positive connotation value, or neutral connotation value for each intermediate emotional sentiment evaluation dimension. The predictive data analysis computing entity 106 may then sum the resulting values for each intermediate emotional sentiment evaluation dimension to generate an overall negative emotional sentiment score, an overall positive emotional sentiment score, or an overall neutral emotional sentiment score for the input text sequence.

An operational example of an emotional sentiment score transformation object 600 is depicted in FIG. 6. The emotional sentiment score transformation object 600 may comprise an emotional sentiment score transformation weight value 605 for each emotional sentiment evaluation dimension 601. The emotional sentiment score transformation object 600 depicted also comprises a negative connotation value 602, neutral connotation value 603, and positive connotation value 604 associated with each intermediate emotional sentiment evaluation dimension.

The negative connotation value 607, neutral connotation value 608, and positive connotation value 609 associated with the intermediate emotional sentiment evaluation dimension 606 sum to a total value of 1. In some embodiments, the value for the negative connotation value 607, neutral connotation value 608, and positive connotation value 609 is indicative of the percentage of correlation between the intermediate emotional sentiment evaluation dimension and the respective connotation value. For example, the largest connotation value for the intermediate emotional sentiment evaluation dimension 606 is the negative connotation value 607. As such, the intermediate emotional sentiment evaluation dimension may be most closely associated with a negative connotation value.

The emotional sentiment score transformation weight value 610 for the intermediate emotional sentiment evaluation dimension 606 may be determined based at least in part on the negative connotation value 607, neutral connotation value 608, and positive connotation value 609. In this instance, the emotional sentiment score transformation weight value 610 for the intermediate emotional sentiment evaluation dimension 606 is the difference between the negative connotation value 607 and the positive connotation value 609.

In order to determine the overall emotional sentiment score for the input text sequence, the emotional sentiment score transformation weight values 605 may be multiplied with the intermediate emotional scores 502 (See FIG. 5) for each corresponding intermediate emotional sentiment evaluation dimension. For example, the emotional sentiment score transformation weight values 610 for the intermediate emotional sentiment evaluation dimension 606 may be multiplied with the intermediate emotional scores 504 (See FIG. 5) for the corresponding intermediate emotional sentiment evaluation dimension 503. This may be performed for each intermediate emotional sentiment evaluation dimension and the overall emotional sentiment score may be generated by summing each of the resulting values.

In order to determine the overall negative emotional sentiment score, overall positive emotional sentiment score, or overall neutral emotional sentiment score for the input text sequence, the negative connotation value 607, positive connotation value 609, or neutral connotation value 608 may be multiplied with the intermediate emotional scores 502 (See FIG. 5) for each corresponding intermediate emotional sentiment evaluation dimension. For example, the positive connotation value 609 for the intermediate emotional sentiment evaluation dimension 606 may be multiplied with the intermediate emotional scores 504 (See FIG. 5) for the corresponding intermediate emotional sentiment evaluation dimension 503. This may be performed for each intermediate emotional sentiment evaluation dimension and the overall positive emotional sentiment score may be generated by summing each of the resulting values. As another example, the negative connotation value 607 for the intermediate emotional sentiment evaluation dimension 606 may be multiplied with the intermediate emotional scores 504 (See FIG. 5) for the corresponding intermediate emotional sentiment evaluation dimension 503. This may be performed for each intermediate emotional sentiment evaluation dimension and the overall negative emotional sentiment score may be generated by summing each of the resulting values.

By using the techniques described in relation to step/operation 403, various embodiments of the present invention address technical challenges related to efficiently and reliably performing predictive data analysis without the use of labelled data. For example, in some embodiments, proposed solutions disclose generating an overall emotional sentiment score for an input text sequence. An emotional sentiment machine learning model may process the input text sequence and generate an intermediate emotional sentiment score object comprising a plurality of intermediate emotional scores each associated with an intermediate emotional sentiment evaluation dimension. The overall emotional sentiment score may be generated based at least in part on the intermediate emotional sentiment score object, and by utilizing an emotional sentiment score transformation object, wherein the emotional sentiment score transformation object comprises an emotional sentiment score transformation weight value for each intermediate emotional sentiment evaluation dimension. One or more prediction-based actions may then be performed based at least in part on the overall emotional sentiment score. In doing so, various embodiments of the present invention address shortcomings of existing predictive data analysis solutions and enable solutions that are capable of efficiently and reliably performing predictive data analysis without the use of labeled training data.

At step/operation 404, the predictive analysis engine 112 of the predictive data analysis computing entity 106 may perform one or more prediction-based actions based at least in part on the overall emotional sentiment score as generated in step/operation 403. In some embodiments, the predictive analysis engine 112 of the predictive data analysis computing entity 106 may perform one or more prediction-based actions based at least in part on the overall negative emotional sentiment score, overall neutral emotional sentiment score, and/or overall positive emotional sentiment score.

For example, the one or more prediction based actions may comprise determining whether the overall emotional sentiment score satisfies one or more emotional sentiment score thresholds. In some embodiments, the one or more emotional sentiment score thresholds may be configured by a user. In some embodiments, the one or more emotional sentiment score thresholds may be automatically configured by the predictive analysis engine 112 and/or the emotional sentiment machine learning model. In some embodiments, in an instance the overall emotional sentiment score satisfies the one or more emotional sentiment score thresholds, the predictive analysis engine 112 and/or the emotional sentiment machine learning model may output an indication that the overall emotional sentiment score satisfies the one or more emotional sentiment score thresholds to one or more external computing entities 102. In some embodiments, the external computing entity 102 may be configured to present one or more notifications to an end user of the computing entity.

In some embodiments, in an instance the overall emotional sentiment score fails to satisfy the one or more emotional sentiment score thresholds, the predictive analysis engine 112 and/or the emotional sentiment machine learning model may output an indication that the overall emotional sentiment score fails to satisfies the one or more emotional sentiment score thresholds to one or more external computing entities 102. In some embodiments, the external computing entity 102 may be configured to present one or more notifications to an end user of the computing entity such that the end user is made aware that the input text sequence fails one or more emotional sentiment score thresholds. In some embodiments, the predictive analysis engine 112 and/or the emotional sentiment machine learning model may output an indication of which of the one or more emotional sentiment score thresholds the overall emotional sentiment score fails to satisfy to one or more external computing entities 102. As such, a user may be prompted to revise the input text sequence manually.

In some embodiments, in an instance the overall emotional sentiment score fails to satisfy the one or more emotional sentiment score thresholds, the predictive analysis engine 112 may provide the overall emotional sentiment score to one or more processing models such that the one or more processing models may generate one or more modified text sequences based at least in part on the input text sequence and the target composite sentiment designation. In some embodiments, the one or more processing models are machine learning models may be used to generate one or more modified text sequences such that the one or more modifies text sequences satisfy the one or more emotional sentiment score thresholds. In some embodiments, the one or more words comprising the input text sequence may be modified to generate the modified text sequence. In some embodiments, the modified text sequence may be provided to the predictive analysis engine 112 of the predictive data analysis computing entity 106 for processing. In this way, the input text sequence may be iteratively modified until it satisfies the one or more emotional sentiment score thresholds.

An operational example of an input text sequence 901 and modified text sequence 902 is depicted in FIG. 9. The overall emotional sentiment score for the input text sequence 901 may have been determined to fail to satisfy one or more emotional sentiment score thresholds. As such, the a modified text sequence 902 may be generated. One or more words from the modified text sequence 902 have been generated by modifying (e.g., replacing, deleting, adding, and/or the like) words from the input text sequence 901. However, the modified text sequence 902 still conveys the same message as the input text sequence.

Accordingly, using the above-described techniques, various embodiments of the present invention address technical challenges related to efficiently and reliably performing predictive data analysis without the use of labelled data. For example, in some embodiments, proposed solutions disclose generating an overall emotional sentiment score for an input text sequence. An emotional sentiment machine learning model may process the input text sequence and generate an intermediate emotional sentiment score object comprising a plurality of intermediate emotional scores each associated with an intermediate emotional sentiment evaluation dimension. The overall emotional sentiment score may be generated based at least in part on the intermediate emotional sentiment score object, and by utilizing an emotional sentiment score transformation object, wherein the emotional sentiment score transformation object comprises an emotional sentiment score transformation weight value for each intermediate emotional sentiment evaluation dimension. One or more prediction-based actions may then be performed based at least in part on the overall emotional sentiment score. In doing so, various embodiments of the present invention address shortcomings of existing predictive data analysis solutions and enable solutions that are capable of efficiently and reliably performing predictive data analysis without the use of labeled training data.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
   receiving, using one or more processors, an input text sequence;
   generating, using the one or more processors and responsive to inputting the input text sequence into a neural network, an intermediate emotional sentiment score object that represents the input text sequence as a plurality of intermediate emotional sentiment evaluation dimensions, each associated with a distinct emotion of a plurality of distinct emotions;
   generating, using the one or more processors, based at least in part on a subset of the plurality of intermediate emotional sentiment evaluation dimensions that is associated with a target composite sentiment designation, an overall emotional sentiment score by applying respective weights to the subset of the plurality of intermediate emotional sentiment evaluation dimensions; and
   until the overall emotional sentiment score satisfies one or more emotional sentiment score thresholds, iteratively modifying, using the one or more processors, the input text sequence.

2. The computer-implemented method of claim 1, wherein the plurality of intermediate emotional sentiment evaluation dimensions corresponds to a plurality of emoji designations.

3. The computer-implemented method of claim 1, wherein generating a respective weight of the respective weights comprises:
   identifying, using the one or more processors,
   (i) one or more negative connotation values,
   (ii) one or more positive connotation values, and
   (iii) one or more neutral connotation values associated with an intermediate emotional sentiment evaluation dimension of the plurality of intermediate emotional sentiment evaluation dimensions for the respective weight; and
   determining, using the one or more processors, the respective weight based at least in part on the one or more negative connotation values, the one or more positive connotation values, and the one or more neutral connotation values.

4. The computer-implemented method of claim 1, further comprising:
   identifying, using the one or more processors,
   (i) one or more negative connotation values,
   (ii) one or more positive connotation values, and
   (iii) one or more neutral connotation values associated with an intermediate emotional sentiment evaluation dimension of the plurality of intermediate emotional sentiment evaluation dimensions; and
   generating, using the one or more processors, based at least in part on the one or more negative connotation values, the one or more positive connotation values, the one or more neutral connotation values, and the intermediate emotional sentiment score object, one or more of (i) an overall negative emotional sentiment score, (ii)

an overall positive emotional sentiment score, or (iii) an overall neutral emotional sentiment score for the input text sequence.

5. The computer-implemented method of claim 1, wherein the input text sequence comprises one or more words each comprising one or more text characters.

6. The computer-implemented method of claim 1, further comprising:
 determining, using the one or more processors, whether the overall emotional sentiment score satisfies the one or more emotional sentiment score thresholds.

7. The computer-implemented method of claim 6, further comprising:
 responsive to determining that the overall emotional sentiment score fails to satisfy the one or more emotional sentiment score thresholds, modifying, using the one or more processors and one or more processing models, the input text sequence.

8. The computer-implemented method of claim 1, wherein the neural network comprises a long short term memory neural network.

9. A system comprising one or more processors and at least one memory storing processor executable instructions that, when executed by one or more of the one or more processors, configure the system to perform operations comprising:
 receiving an input text sequence;
 generating, responsive to inputting the input text sequence into a neural network, an intermediate emotional sentiment score object that represents the input text sequence as a plurality of intermediate emotional sentiment evaluation dimensions, each associated with a distinct emotion of a plurality of distinct emotions;
 generating, based at least in part on a subset of the plurality of intermediate emotional sentiment evaluation dimensions that is associated with a target composite sentiment designation, an overall emotional sentiment score by applying respective weights to the subset of the plurality of intermediate emotional sentiment evaluation dimensions; and
 until the overall emotional sentiment score satisfies one or more emotional sentiment score thresholds, iteratively modifying the input text sequence.

10. The system of claim 9, wherein the plurality of intermediate emotional sentiment evaluation dimensions corresponds to a plurality of emoji designations.

11. The system of claim 9, wherein the to generate a respective weight of the respective weights, the operations further comprise:
 identifying
  (i) one or more negative connotation values,
  (ii) one or more positive connotation values, and
  (iii) one or more neutral connotation values associated with an intermediate emotional sentiment evaluation dimension of the plurality of intermediate emotional sentiment evaluation dimensions for the respective weight; and
 determining the respective weight based at least in part on the one or more negative connotation values, the one or more positive connotation values, and the one or more neutral connotation values.

12. The system of claim 9, wherein the one or more processors are further configured to operations further comprise:
 identifying
  (i) one or more negative connotation values,
  (ii) one or more positive connotation values, and
  (iii) one or more neutral connotation values associated with an intermediate emotional sentiment evaluation dimension of the plurality of intermediate emotional sentiment evaluation dimensions; and
 generating, based at least in part on the one or more negative connotation values, the one or more positive connotation values, the one or more neutral connotation values, and the intermediate emotional sentiment score object, one or more of (i) an overall negative emotional sentiment score, (ii) an overall positive emotional sentiment score, or (iii) an overall neutral emotional sentiment score for the input text sequence.

13. The system of claim 9, wherein the input text sequence comprises one or more words each comprising one or more text characters.

14. The system of claim 9, wherein the operations further comprise:
 determining whether the overall emotional sentiment score satisfies the one or more emotional sentiment score thresholds.

15. The system of claim 14, wherein the operations further comprise:
 responsive to determining that the overall emotional sentiment score fails to satisfy the one or more emotional sentiment score thresholds, modifying, using one or more processing models, the input text sequence.

16. The system of claim 9, wherein the neural network comprises a long short term memory neural network.

17. One or more non-transitory computer-readable storage media including instructions that configure one or more processors to perform operations comprising:
 receiving an input text sequence;
 generating, responsive to inputting the input text sequence into a neural network, an intermediate emotional sentiment score object that represents the input text sequence as a plurality of intermediate emotional sentiment evaluation dimensions, each associated with a distinct emotion of a plurality of distinct emotions;
 generating, based at least in part on a subset of the plurality of intermediate emotional sentiment evaluation dimensions that is associated with a target composite sentiment designation, an overall emotional sentiment score by applying respective weights to the subset of the plurality of intermediate emotional sentiment evaluation dimensions; and
 until the overall emotional sentiment score satisfies one or more emotional sentiment score thresholds, iteratively modifying the input text sequence.

18. The one or more non-transitory computer-readable storage media of claim 17, wherein, to generate a respective weight of the respective weights, the operations further comprise:
 identifying
  (i) one or more negative connotation values,
  (ii) one or more positive connotation values, and
  (iii) one or more neutral connotation values associated with an intermediate emotional sentiment evaluation dimension of the plurality of intermediate emotional sentiment evaluation dimensions for the respective weight; and
 determining the respective weight based at least in part on the one or more negative connotation values, the one or more positive connotation values, and the one or more neutral connotation values.

19. The one or more non-transitory computer-readable storage media of claim 17, wherein the operations further comprise:
  identifying
  (i) one or more negative connotation values,
  (ii) one or more positive connotation values, and
  (iii) one or more neutral connotation values associated with an intermediate emotional sentiment evaluation dimension of the plurality of intermediate emotional sentiment evaluation dimensions; and
  generating, based at least in part on the one or more negative connotation values, the one or more positive connotation values, the one or more neutral connotation values, and the intermediate emotional sentiment score object, one or more of (i) an overall negative emotional sentiment score, (ii) an overall positive emotional sentiment score, or (iii) an overall neutral emotional sentiment score for the input text sequence.

\* \* \* \* \*

UNITED STATES PATENT AND TRADEMARK OFFICE
CERTIFICATE OF CORRECTION

| | | |
|---|---|---|
| PATENT NO. | : 12,254,273 B2 | Page 1 of 1 |
| APPLICATION NO. | : 17/517120 | |
| DATED | : March 18, 2025 | |
| INVENTOR(S) | : Rajesh Sabapathy et al. | |

It is certified that error appears in the above-identified patent and that said Letters Patent is hereby corrected as shown below:

In the Claims

In Column 27, Line 47, Claim 11, delete "wherein the to" and insert -- wherein, to --, therefor.

Signed and Sealed this
Eighth Day of July, 2025

Coke Morgan Stewart
*Acting Director of the United States Patent and Trademark Office*